United States Patent [19]

Szenczy

[11] 3,939,966
[45] Feb. 24, 1976

[54] ORIENTER FOR SQUARE CYLINDERS

[75] Inventor: George Szenczy, Fayetteville, N.Y.

[73] Assignee: Lipe Rollway Corporation, Syracuse, N.Y.

[22] Filed: June 24, 1974

[21] Appl. No.: 482,219

[52] U.S. Cl............ 198/240; 198/250; 198/220 BA
[51] Int. Cl.².......................................... B65G 47/24
[58] Field of Search....... 198/250, 220 BA, 220 BC, 198/238, 240, 267, 276, 268, 277, 278, 256, 30, 288, 289

[56] References Cited

UNITED STATES PATENTS

| | | | |
|---|---|---|---|
| 2,586,523 | 2/1952 | Dudley, Jr. | 198/276 |
| 2,956,665 | 10/1960 | Arlin | 198/288 |
| 3,150,762 | 9/1964 | Tricinci | 198/276 |
| 3,224,553 | 12/1965 | Campbell | 198/276 |
| 3,578,142 | 5/1971 | Burgess, Jr. | 198/250 |
| 3,835,983 | 9/1974 | Horii | 198/220 BA |
| 3,841,471 | 10/1974 | Mead | 198/220 BA |

Primary Examiner—Robert J. Spar
Assistant Examiner—James M. Slattery
Attorney, Agent, or Firm—Stonebraker, Shepard & Stephens

[57] ABSTRACT

An adjustable orienter mounts along the output path of a vibratory feeder for axially orienting uniform cylinders having a length-to-diameter ratio of approximately 1. The orienter includes a guide plate having a bottom edge in close proximity to the output path and extending upward with an upper surface inclined away from the inside edge of the output path with distance above the output path. A wiper plate is mounted above the inclined surface of the guide plate, and both the guide plate and wiper plate are adjustable and cooperate with each other to allow the cylinders with their axes aligned with the inside edge to move along the output path between the inside edge and the guide plate with a cylindrical side portion overhanging the inclined surface of the guide plate, while the cylinders having axes transverse to the inside edge are tipped over the inside edge by the guide plate or, if they reach the wiper plate, are knocked over the inside edge by the wiper plate.

12 Claims, 7 Drawing Figures

ORIENTER FOR SQUARE CYLINDERS

THE INVENTIVE IMPROVEMENT

Many orienting devices have been proposed for orienting a variety of parts or objects fed by vibratory feeders, and one common device is a wiper plate that wipes improperly oriented objects off the output path and back to a lower region. For square rollers or cylinders having a length-to-diameter ratio of approximately 1, such a wiper plate cannot be used. The ordinary way of obtaining an axially aligned orientation for square rollers or cylinders was to move them over a vertically oriented bushing of approximately the same inside diameter as the cylinders so that only those cylinders that tip axially endwise into the bushing are accepted, and all others pass beyond the bushing for recirculation. This requires a precise-sized bushing for each cylinder size, and it is also relatively slow.

The invention involves recognition of a way of orienting square rollers or cylinders in axial end-to-end alignment by a device that is faster and more reliable than the prior art bushing. The invention also aims at convenient adjustability and capacity to accommodate many sizes of square cylinders with minimum changeover effort.

SUMMARY OF THE INVENTION

The inventive orienter is applied to a vibratory feeder having an output path with an inside edge elevated above a lower input region and is used for axially orienting uniform cylinders having a length-to-diameter ratio of approximately 1. The device includes a guide plate having a bottom edge in close proximity to the output path and extending upward from the output path and substantially parallel with the inside edge. The guide plate is adjustable to set the lateral distance of the bottom edge of the guide plate from the inside edge of the output path, and the upper surface of the guide plate is inclined to extend away from the inside edge with distance above the output path. A wiper plate is mounted above the inclined surface of the guide plate and is vertically adjustable above the output path. The wiper plate is inclined to extend toward the inside edge of the output path with distance above the output path. The guide plate and wiper plate cooperate with each other to allow the cylinders having axes aligned with the inside edge to move along the output path between the inside edge and the guide plate and underneath the wiper plate with a cylinder's side portion overhanging the inclined surface of the guide plate while the cylinders having axes transverse to the inside edge are tipped over the inside edge to the lower region.

DRAWINGS

DETAILED DESCRIPTION

The inventive orienter applies to vibratory feeders occurring in many forms. A common element of many vibratory feeders is an output path having an inside edge elevated above a lower input region so that improperly oriented objects can be tipped over the inside edge of the output path and fall to the lower region for recirculation, and only properly oriented objects stay on the output path to be fed out of the device. Many of such feeders have a bowl-like configuration, and such feeders have also been made with an inclined path having a generally 180° turn and surfaced with a pile material having bristles inclined in the direction of feed. Combinations of bowl-configurations and pile surfacings are also possible, and the inventive orienter can be used with any vibratory feeder having a recirculation path for improperly oriented objects.

The inventive orienter is intended for orienting square rollers or cylinders in an axially end-to-end alignment. "Square" is an abbreviated way of referring to cylinders that have a length-to-diameter ratio of approximately 1, so that their diameter approximately equals their length. Square cylinders are about the same height in any possible orientation, and hence cannot be wiped off the output path by a conventional wiper plate. The vertically oriented output bushings previously used in the art for orienting square cylinders had a maximum outfeed speed of 20–30 inches per minute, and the inventive orienter orients square cylinders for an outfeed speed of the maximum speed of the feeder, and has successfully achieved outfeed speeds of nearly 100 inches per minute with increased reliability to achieve significant speed and reliability advantages over the best known prior art orienter for square cylinders.

Figure 1:
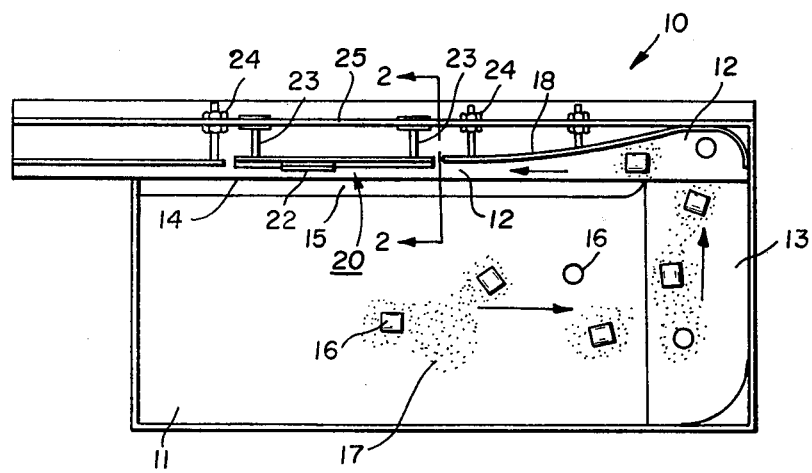
FIG. 1 is a plan view of one preferred embodiment of a vibratory feeder having the inventive orienter.

Vibratory feeder 10 as shown in FIG. 1 is a vibratory pile feeder having an input region 11, a turn 13 of approximately 180°, and an output path 12 having an inside edge 14 elevated above input region 11. A downwardly sloping surface 15 extends from inside edge 14 down to input region 11 so that any cylinders 16 that tip over edge 14 roll down surface 15 and back to input region 11 for recirculation around feeder 10. The vibration of pile bristles 17 on the feed surfaces of feeder 10 moves cylinders 16 along in the direction of the arrows. An adjustable guide or fence 18 sets the width of output path 12, and the inventive orienter 20 is mounted along output path 12 for quickly, efficiently, and accurately rejecting all but axially aligned square cylinders 16.

Figure 2:
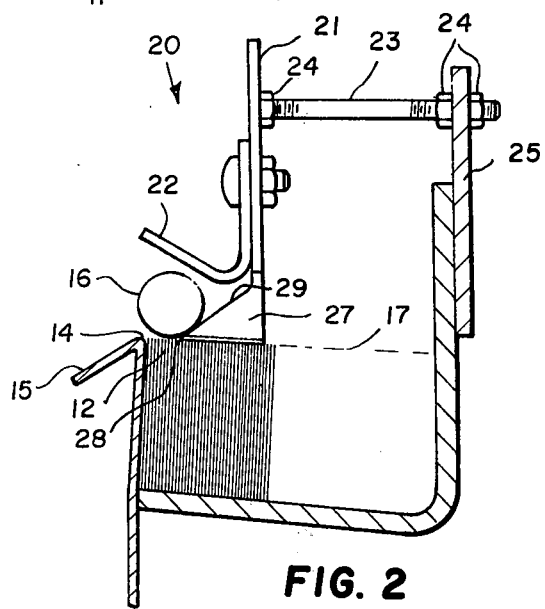
FIG. 2 is a cross-sectional view of the output path of the feeder of FIG. 1 taken along the line 2—2 thereof to show an end elevation of the inventive orienter.
Figure 3:
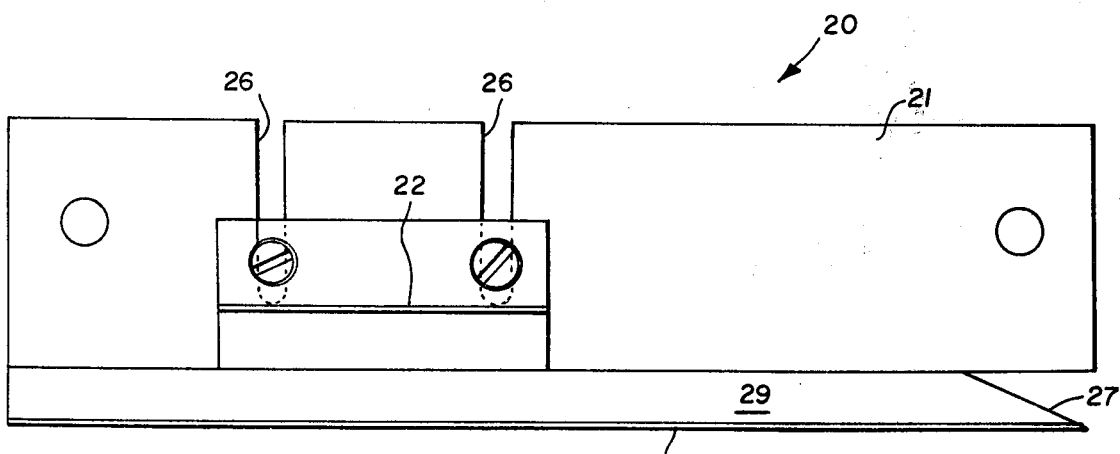
FIG. 3 is a side elevational view of the orienter of FIG. 2.

Orienter 20 is formed of a guide plate 21 and a wiper plate 22, both of which are preferably adjustable. Guide plate 21 can be mounted on adjustable fence 18, and wiper plate 22 is preferably mounted on guide plate 21, but as best shown in FIG. 2, guide plate 21 is preferably mounted directly to fixed rail 25 of feeder 10. Threaded rods 23 and nuts 24 adjustably mount guide plate 21 on the rail 25 of feeder 10 so that guide plate 21 is laterally adjustable relative to the inside edge 14 of output path 12. Many other mountings and adjustments are also possible for guide plate 21. Wiper plate 22 is vertically adjustable in slots 26 in plate 21, but other mountings and adjustments are also possible for wiper plate 22.

The input edge of guide plate 21 approached by cylinders 16 has a bevelled end 27, and the bottom edge 28 of guide plate 21 is in close proximity to the tips of pile bristles 17 and is substantially parallel with inside edge 14 of output path 12. Above bottom edge 28, guide plate 21 has an upper inclinded obliquely upward facing surface 29 extending above the output path and inclined to extend away from inside edge 14 with distance above output path 12. Surface 29 is inclined 15°–60° relative to the horizontal, and is preferably inclined by about 35° relative to the horizontal.

Figure 4:
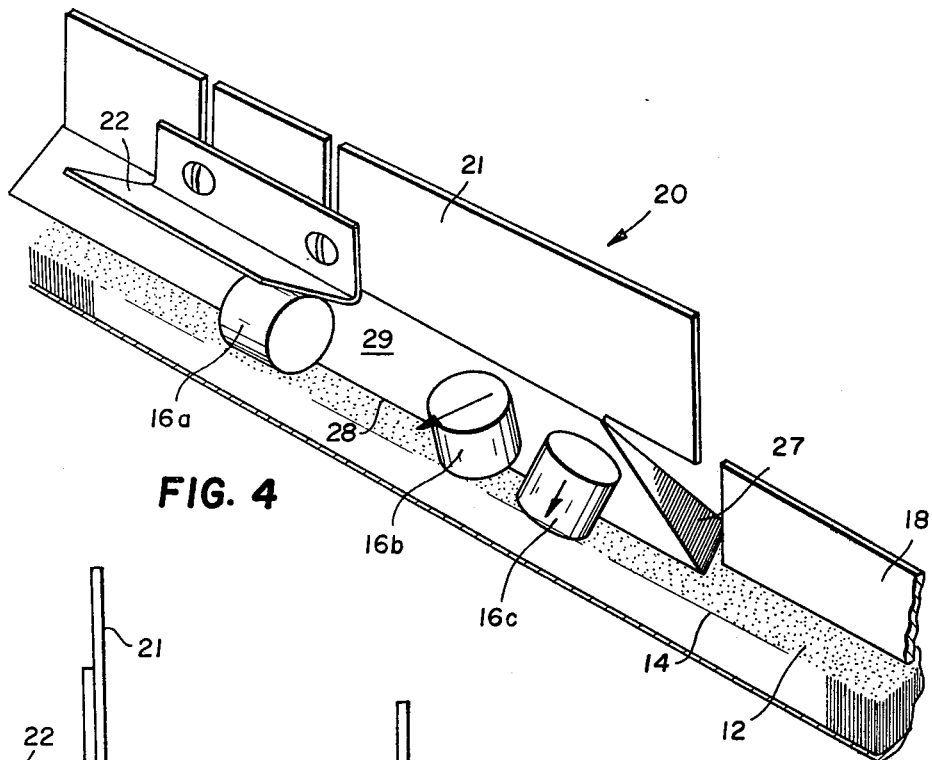
FIG. 4 is a fragmentary, perspective view of the inventive orienter showing various possible orientations of square rollers.
Figure 5:
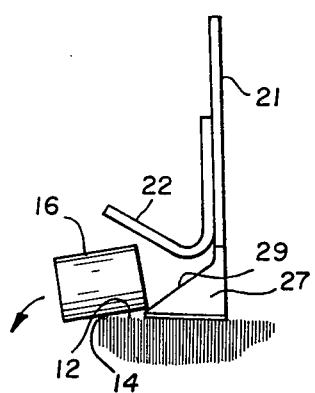
FIGS. 5–7 are fragmentary end elevational views of the inventive orienter rejecting square rollers misaligned in various ways.
Figure 6:
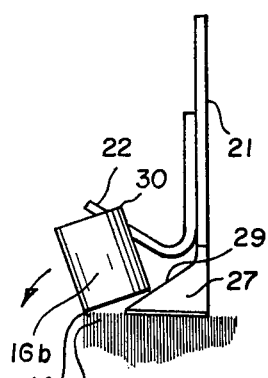
Figure 7:
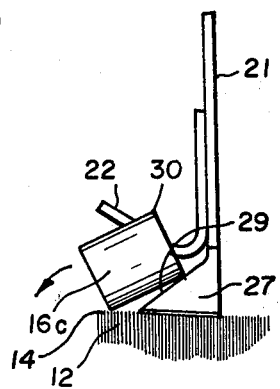

As rollers 16 approach guide plate 21, they encounter the bevelled surface 27 at the input edge of guide plate 21 and are generally urged toward the inside edge 14 of output path 12. Bevelled edge 27 also tends to raise up the ends of transversely oriented cylinders to tilt cylinders over edge 14 to shift their mass toward edge 14 so that the tilting and the vibration will topple them over edge 14 and down to input region 11. Various ways this can occur are shown in FIGS. 4–7. For example, one circular end of cylinder 16b has ridden up the bevel of surface 27 as shown in FIG. 4 and is moving along the inclined surface 29 of guide plate 21 in a tilted orientation overhanging edge 14. This is also illustrated in FIG. 6 where cylinder 16b is shown to be unstable, especially in response to vibration so that it is very likely to tip over edge 14 and fall to the lower region. Cylinder 16c oriented in a transverse rolling orientation has rolled up beveled surface 27 and is rolling along surface 29 of guide plate 21 as shown in FIGS. 4 and 7 and is also tilted over edge 14 and likely to tip over edge 14 to the lower region. A transversely oriented cylinder 16 that does not move up inclined surface 29 of guide plate 21 is necessarily forced out over inside edge 14 and also tips over edge 14 to the lower region as shown in FIG. 5.

The only cylinders 16 that are accepted by the inventive orienter are oriented in axially end-to-end alignment as shown in FIG. 2 and as represented by cylinder 16a of FIG. 4. Cylinders 16 oriented as shown in FIG. 2 have cylindrical side portions overhanging inclined surface 29 of guide plate 21 and bottom edge 28 of guide plate 21 and are able to pass underneath wiper plate 22. Wiper plate 22 is adjusted to just clear axially oriented cylinders 16a so that any transversely oriented cylinder such as cylinders 16b or 16c of FIGS. 4, 6, and 7 that somehow reach guide plate 22 have an upper edge or upper corner 30 that engages wiper plate 22 for tipping such cylinders over edge 14 for recirculation around the feeder.

Wiper plate 22 need not extend for the whole length of guide plate 21, and can be a fairly short segment as illustrated. Wiper plate 22 is inclined by preferably 30° relative to the horizontal to extend upward and toward inside edge 14 with distance above output path 12 as illustrated, and the angle between surface 29 of guide plate 21 and wiper plate 22 is preferably acute.

Orienter 20 is quickly and easily adjusted for differentsized cylinders 16 merely by laterally adjusting guide plate 21 and vertically adjusting wiper plate 22. Once properly adjusted, the inventive orienter 20 quickly and accurately accepts only properly oriented cylinders 16 for a feeding speed several times faster than was possible with vertically oriented bushings. The inventive orienter 20 is also easily mounted and adapted to any vibratory feeder.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the materials, configurations, and mounting and adjustment possibilities for applying the inventive orienter to any particular feeder.

I claim:
1. In a vibratory feeder having an output path with an inside edge elevated above a lower input region, an orienter in the region of said output path for axially orienting uniform cylinders having a length-to-diameter ratio of substantially one, said orienter comprising:
   a. a guide plate having a bottom edge in close proximity to said output path and substantially parallel with said inside edge of said output path, said guide plate extending upward from said output path;
   b. means for adjusting the lateral distance between said bottom edge of said guide plate and said inside edge of said output path;
   c. said guide plate having an obliquely upward facing surface inclined to extend upward and away from said inside edge with increasing distance above said output path;
   d. a wiper plate mounted above said obliquely upward facing inclined surface of said guide plate;
   e. means for adjusting the height of said wiper plate above said output path;
   f. said wiper plate being inclined to extend upward and toward said inside edge with increasing distance above said output path; and
   g. said guide plate and said wiper plate cooperating with each other to provide means for allowing the cylinders having axes aligned with said inside edge to move along said output path between said inside edge and said guide plate and underneath said wiper plate with a cylindrical side portion overhanging said obliquely upward facing inclined surface of said guide plate while the cylinders having axes transverse to said inside edge are forced over said inside edge by said bottom edge of said guide plate to fall to said lower region and are tilted by said obliquely upward facing inclined surface of said guide plate to tip over said inside edge to fall to said lower region and any of said transversely oriented cylinders reaching said wiper plate are tilted by said obliquely upward facing inclined surface of said guide plate so as to engage said wiper plate and are then tipped over said inside edge to fall to said lower region.

2. The orienter of claim 1 wherein said obliquely upward facing inclined surface of said guide plate is inclined 15° to 60° relative to the horizontal.

3. The orienter of claim 1 wherein said obliquely upward facing inclined surface of said guide plate is inclined about 35° relative to the horizontal.

4. The orienter of claim 1 wherein the inclination between said wiper plate and said obliquely upward facing inclined surface of said guide plate is an acute angle.

5. The orienter of claim 1 wherein said wiper plate is mounted on said guide plate.

6. The orienter of claim 1 wherein said adjusting means for said guide plate and said wiper plate are each screw thread means.

7. The orienter of claim 1 wherein said guide plate has a bevelled input edge leading from said output path up to said obliquely upward facing inclined surface of said guide plate.

8. The orienter of claim 7 wherein said wiper plate is mounted on said guide plate.

9. The orienter of claim 8 wherein the inclination between said wiper plate and said obliquely upward facing inclined surface of said guide plate is an acute angle.

10. The orienter of claim 9 wherein said adjusting means for said guide plate and said wiper plate are each screw thread means.

11. The orienter of claim 10 wherein said obliquely upward facing inclined surface of said guide plate is inclined 15° to 60° relative to the horizontal.

12. The orienter of claim 11 wherein said obliquely upward facing inclined surface of said guide plate is inclined about 35° relative to the horizontal.

* * * * *